United States Patent [19]

Gillberg-LaForce et al.

[11] Patent Number: 5,246,747
[45] Date of Patent: * Sep. 21, 1993

[54] SELF-ASSEMBLED OPTICAL MEDIA

[75] Inventors: Gunilla E. Gillberg-LaForce; Hartmann Leube, both of Summit; Leroy McKenzie, Newark; Elizabeth A. Reeder, Summit; Josefina Pruksarnukul, Montclair; Bettina E. Bonsall, Bridgewater, all of N.J.

[73] Assignee: Hoechst Celanese Corp., Somerville, N.J.

[*] Notice: The portion of the term of this patent subsequent to Sep. 21, 2010 has been disclaimed.

[21] Appl. No.: 812,553

[22] Filed: Dec. 23, 1991

[51] Int. Cl.$^5$ ............................................. G02F 1/1339
[52] U.S. Cl. ........................................ 428/1; 428/64; 428/411.1; 428/913
[58] Field of Search .................. 252/582, 583, 299.01; 428/1, 913, 411.1, 69; 359/75, 328

[56] References Cited

U.S. PATENT DOCUMENTS 5,072,234  12/1991  Crystal et al. ........................... 428/1

OTHER PUBLICATIONS

Shimomura et al., Polymer Journal, vol. 16, pp. 187-190, Feb. 1984.
Penner et al., Macromolecules, vol. 24, pp. 1041-1049, Mar. 1991.
Coates, Liquid Crystals, vol. 2, pp. 63-71, Feb. 1987.

Primary Examiner—Patrick J. Ryan
Assistant Examiner—W. Krynski
Attorney, Agent, or Firm—Michael W. Ferrell

[57] ABSTRACT

Optical media formed from a water soluble polymer and liquid crystal forming amphiphile are disclosed and claimed. The polymer and amphiphile are cast into a film which exhibits an optical axis of symmetry perpendicular to the film surface.

15 Claims, No Drawings

SELF-ASSEMBLED OPTICAL MEDIA

TECHNICAL FIELD

The present invention relates generally to films having ordered structures formed from self-assembling smectic liquid crystal forming molecules and in one embodiment, to such films formed from an aqueous solution of amphiphiles and a water soluble polymer that is cast with mechanical stress such that the film exhibits optical symmetry perpendicular to the surface of the film.

CROSS-REFERENCE TO RELATED APPLICATION

The subject matter of this application is related to that of U.S. patent application Ser. No. 07/812,596, filed concurrently herewith, now U.S. Pat. No. 5,246,748, assigned to Hoechst Celanese Corporation.

BACKGROUND OF INVENTION

Thin films with oriented structures are known in various fields and are useful for a variety of biological, optical and other applications. In the field of nonlinear optics, for example, oriented polymer films with non-centrosymmetric structures are used as waveguiding media for frequency doubling as well as waveguiding media for electro-optic modulators.

In second-order nonlinear optics, the requisite order is achieved in the polymer media by poling the material (which has chromophores with significant dipole moments) in an electric field above the glass transition temperature ($T_g$) of the material followed by cooling the material in the presence of the field below its $T_g$ to freeze the induced structure so that it is retained. Some materials, on the other hand, such as certain liquid crystal systems, will passively exhibit order without the need for applying an electric field. Also, work has been done in the area of surfactant-like materials and Langmuir-Blodgett films to utilize the inherent properties of substances which will orient themselves due to physical interaction with their surroundings.

Ringsdorf, Kunitake and others have investigated a variety of multibilayer films for use as reverse-osmosis membranes. Typically, such films are made by forming an aqueous dispersion of liposomic structures and casting them on a substrate, taking care to evaporate the water slowly. See, "Cast Multibilayer Films from Polymerizable Lipids", *Macromolecules*, Vol. 20 (No. 1), pp. 29–33 (1987); "Immobilization of Cast Bilayer films by Co γ-Irradiation and Other Means", *Polymer Journal*, Vol. 16, No. 7, pp. 583–585. Of particular interest to the present invention is a system disclosed in *Polymer Journal*, Vol. 16, No. 2, pp. 187–190 (1984) in a paper entitled "Immobilization of Synthetic Bilayer Membranes as Multilayered Polymer Films". In this publication, a bilayer film comprising an azobenzene amphiphile/poly(vinyl alcohol) mixture cast on a cellulose acetate membrane is described.

On the other hand, highly ordered films such as those in accordance with the present invention are useful as optical media which may be used for recording information per se or may be used as layers in stratified volume holographic optical elements such as those described in *Optics Letters*, Vol. 13, No. 3 P. 189 et. seq.

SUMMARY OF INVENTION

In accordance with the present invention there are provided ordered multi-layer optical films exhibiting optical symmetry perpendicular to the film surface including a smectic-liquid crystal forming amphiphile and a nonionic water soluble polymer. The films are formed by preparing a solution followed by casting the solution into a film wherein the weight ratio of polymer to said smectic liquid crystal forming amphiphile is from a minimum ratio of about 2:7 to a maximum ratio of about 4:3; that is, from about 22 to about 60 weight percent polymer based on the combined weight of polymer and amphiphile.

Water soluble polymers which may be used in accordance with the present invention include hydroxyalkylcellulose derivatives such as hydroxyethylcellulose or hydroxypropylcellulose. Other polymers such as polyvinylpyrrolidone, other clear film forming polymers and suitable mixtures thereof may be used. Generally speaking, this class of polymers is referred to as nonionic water soluble polymers; however they may readily be dissolved with the amphiphiles in water/alcohol mixtures or other solvents which will dissolve both polymer and amphiphile in the desired concentration range. Particularly preferred molecular weights of the polymers are at least about 300,000 but even higher weights, 1,000,000 or so may in some circumstances be superior.

The smectic liquid crystal forming amphiphiles are most preferably of the azobenzene type described hereinafter, however, other smectic-forming molecules of the type known to form thermotropic or lyotropic smectic systems may also be employed. For example, a suitable amphiphile could be derived from 2-(p-pentylphenyl)-5-( ppentyloxyphenyl) pyrimidine or an α-cephalin if so desired.

Films may be cast in a variety of methods in accordance with the present invention, however, methods involving mechanical stress such as knife-coating are preferred; spin coating being a particularly preferred method.

The films of the present invention exhibit the unique feature that they exhibit optical symmetry about a normal to the film surface which may be useful in embodiments where the film has a single or multiple optical axes. This is manifested by the fact that the films exhibit centrosymmetric conoscopic patterns. Particularly preferred embodiments are those wherein the film appears homeotropic, that is, it appears isotropic by orthoscopy when viewed perpendicular to the film surface, evidencing a single optical axis perpendicular to the film surface.

DETAILED DESCRIPTION

As noted above, the ordered films of the present invention exhibit unique optical properties, making them useful as optical media. Materials and fabrication techniques are selected so that the resulting films exhibit a uniform, homogeneous domain structure as well as optical symmetry perpendicular to the film's surface. In other words, films in accordance with the present invention exhibit the orthoscopic and conoscopic features described below.

Orthoscopy is the observation of the magnified image of an object in polarized light, often in crossed polarizers. If the object remains dark throughout rotation in crossed polarizers, it follows than $\Delta N$ ($N_e - N_o$ for a birefringent material) along that particular direction is 0. This means the film is isotropic, or that it is being viewed along an optical axis. In other words, no birefringence or polarization is occuring. A birefringent film will show brightness upon rotation if not viewed along an optical axis; or will typically show brightness when tilted away from an optical axis. Films produced in accordance with the present invention will show no brightness upon rotation when viewed directly from above if they are uniaxial films, that is, uniaxial films appear isotropic when viewed perpendicular to the film surface. This condition is sometimes referred to hereinafter as homeotropic. This feature is a consequence of the fact that the single optical axis is also perpendicular to the film surface.

Conoscopy differs from orthoscopy in that an interference figure is observed instead of a magnified image of the object. Number and angles of axes and optical characteristics can be determined.

In a typical system of current interest, a uniaxial film with its optical axis perpendicular to the surface will show a centrosymmetric cross which remains stationary when viewed directly from above as the film is rotated around the viewing axis; if the axis were tilted, the cross would migrate eccentrically when the object is rotated. A biaxial film shows a hyperbolic pattern (which can look like a cross, when the two hyperbolae are touching), but the pattern remains centrosymmetric upon rotation even through the individual elements of the pattern migrate if the film has an axis of optical symmetry substantially perpendicular to the film surface. That is, for example, when two optical axes in a biaxial system are tilted at equal angles from the perpendicular to the film surface.

Films in accordance with the present invention exhibit a centrosymmetric conoscopic pattern upon rotation when viewed directly from above (i.e., perpendicular to the film's surface) when they have more than one optical axis under conoscopic observation while uniaxial films exhibit a stationary cross.

Unless otherwise noted, orthoscopic and conoscopic observations on films described herein were made with a Lietz Orthoplan TM polarizing microscope along a direction perpendicular to the film surface. Under orthoscopic observation, a film is thus termed isotropic or birefringent for purposes of brevity and the centrosymmetric/non-centrosymmetric character of certain films is likewise reported below.

Thin film optical media within the scope of the present invention include those comprising alternating strata of a nonionic water-soluble polymer and a selfassembled bilayer of an amphiphilic compound corresponding to the formula:

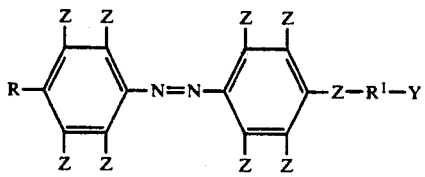

where R is an aliphatic substituent having a chain length of about 6-18 atoms; $R^1$ is a divalent aliphatic substituent having a chain length of about 2-12 atoms; X is a divalent electron-donating substituent; Y is a hydrophilic substituent; and each Z is independently hydrogen, alkyl, halogen, an electron donating or an electron-withdrawing substituent. Other amphiphiles may of course also be used as noted above; for example stilbene derivatives are likewise useful.

In another more specific embodiment this invention provides a thin film optical medium which is a composite comprising alternating strata of a nonionic water-soluble polymer and a self-assembled bilayer of an amphiphilic compound corresponding to the formula:

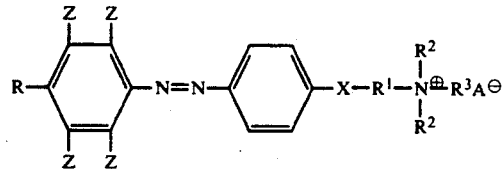

where R is an aliphatic substituent having a chain length of about 6-18 atoms; $R^1$ is a divalent aliphatic substituent having a chain length of about 2-12 atoms; $R^2$ is hydrogen or a $C_1$-$C_4$ alkyl substituent; $R^3$ is hydrogen or a $C_1$-$C_8$ aliphatic substituent; X is a divalent electron-donating substituent; Z is hydrogen or an electron-withdrawing substituent such as a halogen; and A is an anion.

In another specific embodiment this invention provides a thin film optical medium which is a composite comprising alternating strata of a nonionic water-soluble polymer and a self-assembled bilayer of at least one amphiphilic acrylate compound corresponding to the formula:

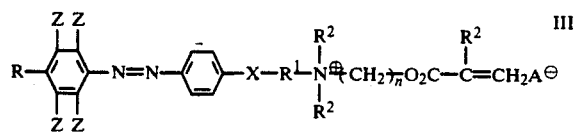

where R is an aliphatic substituent having a chain length of about 6-18 atoms; $R^1$ is a divalent aliphatic substituent having a chain length of about 2-atoms; $R^2$ is hydrogen or a $C_1$-$C_4$ alkyl substituent; X is a divalent electron-donating substituent; Z is hydrogen or an electron-withdrawing substituent; n is an integer with a value of 2-12; and A is an anion.

In formulas I-III the R substituent is illustrated by aliphatic groups which include hexyl, decyl, dodecyl, octadecyl, hexyloxy, decyloxy, octadecyloxy, polyethyleneoxy, hexylthio, and the like.

The $R^1$ substituent in formulas I-III is illustrated by divalent aliphatic groups such as ethylene, butylene, decylene, dodecylene, polyethyleneoxy, and the like.

Illustrative of $R^2$ $C_1$-$C_4$ alkyl substituents are methyl, ethyl, propyl, isopropyl, butyl, isobutyl, 2-butyl, and the like.

Illstrative of the $R^3$ $C_1$-$C_8$ aliphatic substituents are methyl, butyl, hexyl, octyl, hydroxyethyl, hydroxypropyl, hydroxybutyl, mercaptoethyl, mercaptobutyl, and the like.

In formula I the Y substituent is a hydrophillic group selected from anionic, cationic, zwitterionic and nonionic structures characteristic of surfactant molecules.

In formulas I-III the X substituent is a divalent electron-donating radical such as —O—, —S— or —NR—; and Z denotes a hydrogen atom or an electron withdrawing substituent such as —$NO_2$, —CN, —$CF_3$, $SO_2F_3$, —CH=C(CN)$_2$, —C(CN)=C(CN)$_2$, or alkyl groups such as $CH_3$, $CH_2CH_3$, or isopropyl or electron donating groups such as NH, NHR or the like, where R is an organic substituent.

The symbol $A^\ominus$ in formulas II-III represents an anion such as that derived from inorganic and organic acids. Illustrative of $A^\ominus$ are bromide, chloride, phophate, sulfate, hydroxide, nitrate, trifluoromethylsulfonate, acetate, benzoate, citrate, tartrate, acrylate, and the like.

A suitable nonionic water-soluble polymer generally has a molecular weight in the range between 10,000-2,000,000, and has a solubility in water of at least about 1-10 weight percent at 25° C., or in water containing even large amounts of a water-miscible organic cosolvent. Particularly preferred water soluble polymers are those having molecular weights of at least about 300,000, with molecular weights of 1,000,000 or more being typical.

Synthesis of Azobenzene Derivatives

In general azobenzene molecules useful in connection with the present invention may be synthesized as follows:

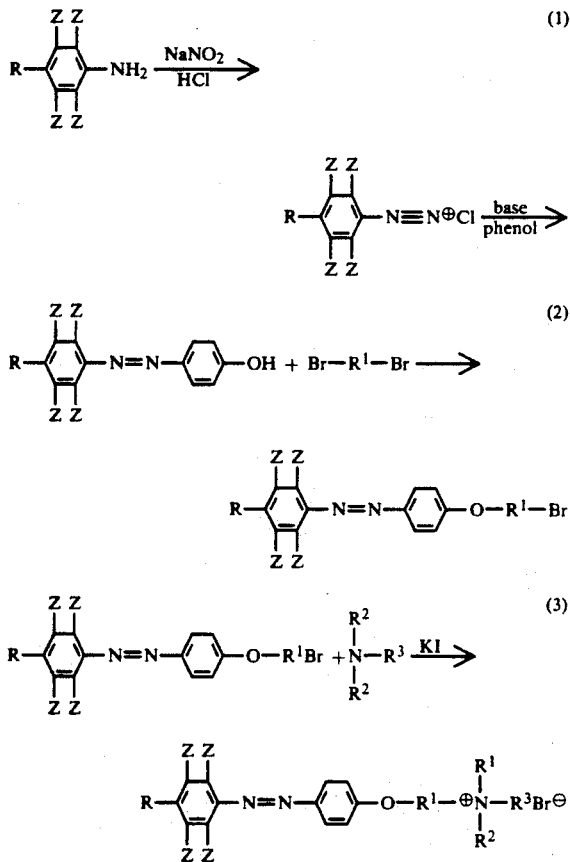

Formation of Self-assembled Composites

An aqueous formulation of amphiphilic compound and nonionic water-soluble polymer is applied to a supporting substrate, and the applied coating is dried to form a thin film on the substrate surface. The aqueous formulation is preferably applied by conventional coating techniques involving mechanical stress such as spincoating, knifecoating, or the like.

The suppporting substrate can be any dimensionally stable material such as glass, silicon or plastic. The thickness of the thin film coating on the substrate can be varied in the range between about 0.1-50 microns. The thin film can be stripped from the substrate surface in the form of an optically transparent film which is free-standing and self-supporting. Preferably, the substrate is hydrophilic.

During the coating and drying phases of the thin film formation procedure, the amphiphilic compound rearranges into self-assembled ordered bilayers, and the bilayers become incorporated into a laminated composite of strata of bilayers and water-soluble polymer. The drying can be performed under ambient conditions, or under ramped conditions with control of humidity and temperature utilizing a Tenney type chamber.

Another preferred present invention optical thin film medium is one in which the amphiphilic component of the composite consists of two or more different compounds corresponding to formula I or II. The presence of two or more different amphiphilic compounds in the self-assembled bilayers minimizes the formation of unwanted crystalline domains in the thin film optical medium. Crystallinity is a disadvantage since it causes a dispersion and scattering of light waves being propagated through the optical medium. For utility in a waveguiding application, it is advantageous to employ a thin film optical medium which has a glass or amorphous appearing physical structure.

Photoinduced Birefringence

A present invention film exhibits photochromism, and is susceptible to photoinduced birefringence. A present invention thin film optical medium has utility in stratified volume holography, all-optical data storage, and light modulation applications.

A present invention thin film optical medium after formation may be isotropic and does not exhibit any birefringence when viewed along a perpendicular to the film surface. If a localized area of a thin film optical medium is irradiated with ultraviolet or visible light energy, the formulas II-III azobenzene chromophores undergo structural isomerization, with a concomitant refractive index change in the irradiated localized area. In this manner a photoinduced birefringence along a direction perpendicular to the film surface is introduced into the homeotropic thin film optical medium.

The following examples are further illustrative of the present invention. The components and specific ingredients are presented as being typical, and various modifications can be derived in view of the foregoing disclosure within the scope of the invention.

EXAMPLE I

This Example illustrates the synthesis of 10-[-4[[4-dodecyl)phenyl]azo]phenoxy]-N-(2-hydroxyethyl)-N,N-dimethyl-1-decanaminium bromide.

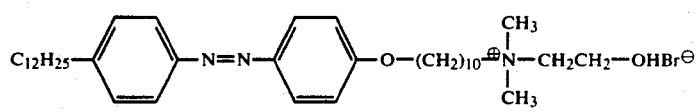

A. 4-dodecyl-4'-hydroxyazobenzene 4-dodecylaniline (50.0 g, 0.192 mol) was dissolved in acetone (400 ml) in a 2000 ml beaker. To the solution was added water (400 ml) and concentrated hydrochloric acid (80 ml), and a milky white suspension was formed. The stirring mixture was chilled to less than 10° C. in an ice-water bath.

In a separate procedure sodium nitrite (20.0 g, 0.290 mol) was dissolved in water (400 ml) and the solution was chilled to less than 10° C. The chilled sodium nitrite solution was added slowly to the aniline suspension while maintaining the temperature below 10° C. After the sodium nitrite addition was complete, the reaction mixture was a clear solution of the diazonium salt.

In a separate procedure a solution containing phenol (27.2 g, 0.289 mol), sodium hydroxide (12.0 g), sodium carbonate (48.0 g), in 800 ml water was prepared in a 2000 ml beaker. The solution of the diazonium salt was poured into the basic phenol solution, and an orange precipitate formed. The mixture was allowed to stir at room temperature for one hour. The pH was lowered from about 9.5 to about 4.5 by the addition of 45 ml of glacial acetic acid. The orange product was isolated by suction filtration and repeatedly washed with water. The crude product was dissolved in 1600 ml of acetone and then precipitated with 1500 ml of water. The orange precipitate was filtered by suction then dried at 40° C. in a forced air oven for 2 hours. The yield was 68.6 g, 97.9%.

TLC on a Merck grade 60 silica gel plate, with ethyl acetate eluent, gave two yellow spots. The major component had an $R_F$ of 0.685. The proton NMR spectrum was recorded for the product in $CDCl_3$ and indicated that the product was at least 98 mole percent pure.

B. 4-(10-bromodecyloxy)-4'-dodecylazobenzene

A 3000 ml three-necked round bottom flask was equipped with magnetic stirring, a heating mantle, a reflux condenser, and a nitrogen atmosphere. The flask was charged with 4-dodecyl-4'-hydroxyazobenzene (60.0 g, 0.164 mol), 1,10-dibromodecane, (66.95 g, 0.223 mol), potassium hydroxide (9.75 g, 0.174 mol), and ethanol (1260 ml). The stirring mixture was refluxed for seven hours. During the course of the reaction, a yellow precipitate formed in the reaction mixture. The reaction mixture then was cooled to room temperature and chilled in an ice-water bath. A crude product was isolated by suction filtration, washed with water, then with hexane. The product was recrystallized from ethyl acetate.

C. 10-[4-[[4-(dodecyl)phenyl]azo]phenoxy]-N-(2-hydroxyethyl)-N,N-dimethyl-1-decanaminium bromide A 3000 ml three-necked round bottom flask was equipped with magnetic stirring, a heating mantle, a reflux condenser, and a nitrogen atmosphere. The flask was charged with 4-(10-bromodecyloxy)-4'-dodecylazobenzene (40 g, 0.068 mol), dimethylethanolamine (95.2 g, 1.068 mole) and 1050 ml of tetrahydrofuran. The reaction mixture was allowed to reflux for 24 hours. During the course of the reaction mixture. After 24 hours, the reaction mixture was cooled to room temperature, and then chilled in an icewater bath. The crystalline solid was isolated by suction filtration. The crude product was dissolved in hot methanol and filtered to remove insoluble impurities. The methanol was removed by evaporation at reduced pressure The crude product was recrystallized from tetrahydrofuran. Yield 28.0 g, 61.0%.

EXAMPLE II

This Example illustrates the production of an optical waveguiding medium from a self-assembled multiple amphiphilic bilayer composite in accordance with the present invention.

0.8 g of the Example I azobenzene was added to 30 g of Millipore DI water and then sonicated with a Heat Systems-Ultrasonics Inc. sonicator model W-375 for 4 minutes using a 50% duty cycle and at an output control of 3. The solution was allowed to cool to room temperature, whereupon 0.4 g of hydroxypropylcellulose (HPC, average MW of 1,000,000, Scientific Polymer Products) was added. The solution was tumbled in a rotational tumbler for about 16 hours to dissolve the polymer. The solution then was filtered utilizing a Millipore pressure cell and a prefilter type AP 15-047-00 and a final filter type RA 1.2 μm, and a nitrogen pressure of 30 psi. At the end of the filtration the pressure was increased to 60 psi.

Glass and quartz substrates were cleaned with hot acetone followed by 50° C. 50% nitric acid cleaning, and then rinsed for 5 minutes under flowing Millipore DI water, and stored under water.

The substrates were spin-dried by spinning a 7850 rpm for 60 seconds on a Solitec spin coater located in a class 10 clean room. The substrate was next full flooded with the azobenzene HPC solution and spin coated for 120 seconds at rates of 450–2000 rpm. In all cases the spin coating resulted in smooth transparent films. The samples were placed in individual, covered petri dishes and then allowed to dry overnight at 19° C. and 40-60% RH. All films remained optically clear after drying.

Microscopic observation confirmed that the films remained dark upon rotation under crossed polarizers when viewed directly from above without any indication of crystalline or liquid crystalline phases. As noted above, these observations are indicative of a uniaxial film. Moreover, the films were uniform throughout. The high optical quality was further demonstrated by the ability to waveguide a HeNe laser beam over several centimeters.

Irradiation with an Argon Laser at 351.4 nm and at 0.83 W for 2 seconds produced a strongly birefringent spot. The spot was polarized parallel to the incident laser beam and exhibited an extreme biaxility. No change of the optical quality of the film in either irradiated or nonirradiated areas was observed over a 2-month study of stability.

EXAMPLE III

A series of films were spin coated from 5 w-% solutions containing azobenzene amphiphiles and HPC in a polymer to amphiphile ratio of 1:3. The solutions were prepared by first making 10 w-% solutions of the azobenzene amphiphiles with different ratios of A-1 and A-2 by sonication, then adding a calculated amount of HPC and tumbling the samples for about 16 hours. The clear viscous solutions were then diluted to 5 w-% by addition of water, and tumbled for another 2 hours. After filtration the solutions were spin coated onto clean glass substrates as described in Example II.

The viscosity of the solutions was determined with a Brookfield cone-plate micro viscometer. The film thicknesses were measured with a Dektak profilometer. The absorption maxima were determined by UV-Vis spectrometry, and the optical characteristics of the films were determined by means of orthoscopy and conoscopy before and after irradiation with UV light.

The experimental procedures and results are summarized in the following Table I.

The A-1 amphiphile is 10-[4-[[4-(dodecyl)phenyl]azo]phenoxy]-N-(2-hydroxyethyl)-N,N-dimethyl-1-decanaminium bromide, and the A-2 amphiphile is 6-[4-[[4-(dodecyl)phenyl]azo]phenoxy]-N-(2-hydroxyethyl)-N,N-dimethyl-1-hexanaminium bromide.

Similar results are observed with the following type amphiphiles singly or in different combinations:

10-[4-[[4-(dodecyl)phenyl]azo]phenoxy]-N-(2-hydroxyethyl)-N,N-dimethyl-1-decanaminium bromide (A-1 amphiphile)

6-[4-[[4-(dodecyl)phenyl]azo]phenoxy]-N-(2-hydroxyethyl)-N,N-dimethyl-1-hexanaminium bromide (A-2 amphiphile)

10-[4-[[4-(dodecyl)phenyl]azo]phenoxy]-N-(2-ethyl methacrylate)-N,N-dimethyl-1-decanaminium bromide (A-3 amphiphile)

10-[4-[[4-(dodecyl)phenyl]azo]phenoxy]-N-benzyl-N,N-dimethyl-1-decanaminium bromide (A-6 amphiphile)

Problems with solubility in water at room temperature were experienced with azo amphiphiles A-4, A-5 and A-7 which had to be spun from hot solutions and had a tendency to form crystalline impurities.

12-[4-[[4-(octadecyloxy)phenyl]azo]phenoxy]-N-(2-hydroxyethyl)-N,N-dimethyl-1-dodecanaminium bromide (A-4)

10-[4-[[4-(octyloxy)phenyl]azo]phenoxy]-N-(2-hydroxyethyl)-N,N-dimethyl-1-decanaminium bromide (A-5)

10-[4-[[4-dodecylphenyl]azo]phenoxyandecanoic acid sodium salt (A-7).

As can be seen, under the foregoing conditions, certain mixtures exhibit the preferred optical characteristics of the present invention, while others do not exhibit substantially centrosymmetric conoscopic patterns along a direction perpendicular to the film surface.

EXAMPLE IV

A.

A 0.4 g amount of the Example I azobenzene amphiphile was added to 7.59 g of water and sonicated for 2 minutes. The solution was added to a HPC solution which was prepared by dissolving 0.133 g of HPC (M. W. 1,000,000) in 2.53 g of water and tumbled for about 16 hours. The combined solutions were tumbled for several hours, then the solution was filtered through a prefilter and a 1.2 $\mu$m RA filter. The viscosity of the solution was 1060 cps. The solution was spin coated onto clean glass substrates for 2 minutes and at speeds of 1000, 2000 and 4000 rpm, yielding film thicknesses of 2.6, 1.5 and 0.9 $\mu$m respectively. All samples were clear, transparent and homogeneous.

B.

A 10% solution of the Example I azobenzene amphiphile was prepared by adding the amphiphile to water and sonicating if for 2 minutes. A premade 2.5% solution of HPC (M. W. 1,000,000) was added to yield a final solid content of 5% and a ratio of amphiphile to HPC of 67/33. The solution was sonicated for 30 seconds and then filtered. The viscosity of the solution was 1270 cps. The solution was spin coated onto glass substrates at 2000 and 4000 rpm for 2 minutes to provide optically clear films 25 with thicknesses of 1.9 and 1.0 $\mu$m.

EXAMPLE V

A 3 g amount of the Example I azobenzene amphiphile was added to 85 g of water and sonicated for 1.5 minutes. A 1.5 g amount of polyvinyl alcohol (weight average molecular weight of 115,000) was added to the solution. The solution was refluxed until all polyvinyl alcohol had dissolved, and the resulting solution was concentrated to 19% solid content. The solution was spin coated onto glass substrates at a speed of 1000 rpm for 2 minutes to provide a film thickness of 3.3 $\mu$m. The films had high optical quality areas and hazy areas.

TABLE I

5-W-% Solution of Azobenzene Amphiphiles And Hydroxypropyl Cellulose (M.W. 1,000,000) in a 75/25 Weight Ratio

| A1/A2 Ratio | Viscosity CPS | Spin RPM/secs | Film Thickness $\mu$m | UV-VIS nm | Orthoscopic, Conoscopic Observation |
|---|---|---|---|---|---|
| 100/0 | 655 | 750/120 | 2.5 | 335 | BIREFRINGENT, NON-CENTROSYMMETRIC |
| | 655 | 1000/120 | 2.0 | 325 | BIREFRINGENT, NON-CENTROSYMMETRIC |
| | 655 | 2000/120 | 1.4 | 325 | BIREFRINGENT, NON-CENTROSYMMETRIC |
| | 655 | 4000/120 | 0.6 | 325 | ISOTROPIC, CENTROSYMMETRIC |
| 80/20 | 816 | 1000/120 | 1.9 | — | ISOTROPIC, CENTROSYMMETRIC |
| | 816 | 2000/120 | 1.1 | 330 | ISOTROPIC, CENTROSYMMETRIC |
| | 816 | 4000/120 | 0.6 | 330 | ISOTROPIC, CENTROSYMMETRIC |
| 60/40 | 205 | 1000/120 | 0.4 | 330 | ISOTROPIC, CENTROSYMMETRIC |
| | 205 | 2000/120 | 0.2 | 330 | ISOTROPIC, CENTROSYMMETRIC |
| | 205 | 3000/120 | 0.1 | 330 | ISOTROPIC, CENTROSYMMETRIC |
| | 205 | 4000/120 | 0.1 | 330 | ISOTROPIC, CENTROSYMMETRIC |
| 40/60 | 369 | 1000/120 | 0.9 | 338 | BIREFRINGENT, NONCENTROSYMMETRIC |
| | 369 | 2000/120 | 0.4 | 330 | ISOTROPIC, CENTROSYMMETRIC |
| | 369 | 4000/120 | 0.3 | 330 | ISOTROPIC, CENTROSYMMETRIC |
| 20/80 | 410 | 1000/120 | 1.1 | — | BIREFRINGENT, NON-CENTROSYMMETRIC, |
| | 410 | 2000/120 | 0.7 | 345 | BIREFRINGENT, NON-CENTROSYMMETRIC, |
| | 410 | 4000/120 | 0.3 | 345 | BIREFRINGENT, NON-CENTROSYMMETRIC, |
| 0/100 | 574 | 1000/120 | 1.7 | — | BIREFRINGENT, NON-CENTROSYMMETRIC |

EXAMPLE VI

A.

A 5% solution containing the Example I azobenzene amphiphile and polyvinylpyrrolidone (PVP, M. W. 10,000) in a weight ratio of 67/33 was prepared by first sonicating a water solution containing the amphiphile and then adding the polymer. The solution was tumbled for about 16 hours, then it was filtered and spin coated onto glass substrates at 450 and 1000 rpm for two minutes to provide thin films with a thickness of 0.7 and 0.4 μm respectively.

A UV argon laser induced a highly birefringent spot after 1/100 second irradiation with 1 mW power.

B.

A solution containing 5% of the Example I azobenzene amphiphile and 2.5% of polyvinylpyrrolidone (M. W. 40,000) was prepared by first dispersing the amphiphile in the water by sonication and then adding the polymer. Some water was evaporated off to yield a solid content of approximately 20% and a solution viscosity suitable for spin coating of μm thick films. The solution was spin coated at 1000 rpm for 2 minutes onto clean glass slides to provide a film thickness of 2.7 μm. The films were optically clear.

C.

A quantity of the Example I azobenzene amphiphile was dispersed in water with 1.5 minutes sonication, and polyvinylpyrrolidone (M. W. 1,000,000) was added. The mixture was tumbled for about one hour to form a clear orange solution with a solid content of 6% and a ratio of amphiphile to PVP of 2/1. Water was evaporated off to provide a solid content of 18.5%. The solution was spin coated onto clean glass slides at 1000 rpm for 2 minutes to form a film thickness of 3.8 μm.

EXAMPLE VII

A 5% solution of the Example I azobenzene amphiphile and hydroxypropylmethylcellulose (M. W. 86,000) in a weight ration of 67/33 was prepared by first dispersing the azobenzene amphiphile in water by sonication, adding the polymer, and then tumbling the solution for about 16 hours. The solution was spin coated onto clean glass slides and 1000 rpm for 2 minutes yielding a film thickness of 2 μm.

EXAMPLE VIII

A series of 5% solutions were prepared containing an 80/20 mixture of azobenzene amphiphiles A-1/A-2 and polyvinylpyrrolidone (PVP), the ratio of amphiphile to polymer was 75/25. The molecular weight of the PVP was 10,000, 40,000, 160,000, 360,000 and 1,000,000. The solutions were prepared as previously described. The solutions were spin coated at 500 rpm for 120 seconds. Optical microscopy showed them all to be uniaxial homeotropic films. The films containing lower molecular weight PVP showed larger flaws as a result from dust particles on the substrate. Irradiation with an Argon laser utilizing the 350 nm line at a power of 0.5 W for 1/125 seconds resulted in all cases in birefringent spots.

| PVP MW | Film thickness μm | Dot size (mm) |
| --- | --- | --- |
| 10,000 | 0.4 | 1.8 |
| 40,000 | 0.4 | 2.0 |
| 160,000 | 0.6 | 2.3 |
| 360,000 | 0.6 | 2.4 |
| 1,000,000 | 0.6 | 2.4 |

EXAMPLE IX

A series of 5% solutions were prepared containing an 80/20 mixture of azobenzene amphiphiles A-1/A-2 and hydroxypropylcellulose (HPC) in MW 60,000, 100,000, 300,000 and 1,000,000 using standard procedure. The solution containing HPC of MW 60,000 was spin coated at 750 rpm, the one with MW 100,000 at 2000 rpm, with MW 300,000 at 3000 rpm and with MW 1,000,000 at 3000 and 4000 rpm for 2 minutes. Optical microscopy showed all films to be homeotropic and uniaxial. Irradiation with 350 nm line at 0.5 W for 1/125 seconds gave in all cases birefringent dots.

| HPC MW | Film thickness μm | Dot size (mm) |
| --- | --- | --- |
| 60,000 | 0.7 | 2.2 |
| 100,000 | 0.7 | 2.3 |
| 300,000 | 0.9 | 2.1 |
| 1,000,000 | 1.0 | 1.8 |
| 1,000,000 | 0.5 | 1.8 |

EXAMPLE X

Homeotropic and uniaxial films of azobenzene amphiphiles A-1/A-2 (80/20) and 1 million MW PVP or HPC in weight ratio amphiphile to polymer of 75/25 were irradiated with different UV and visible lines of an Argon laser. Polarized birefringent dots of the nominal laser line size were obtained at 333 nm, 0.24 W, 1/125 seconds exposure, at 363.8 nm, 0.39 W, 1/10 seconds exposure, at 472 nm, 0.52 W and 5 seconds exposure and at 514 nm, 5.6 W and 1 second exposure. The experiment thus show that the dots can be written in the films both in the UV and Vis region but that the films exhibit higher sensitivity close to absorption maxima. Samples stored in daylight do not develop any birefringent marks.

EXAMPLE XI

An 80/20 mixture of azoamphiphiles A-1 and A-2 was dissolved in 50/50 water/ethanol to yield a 15% solution. 5% of polyvinylpyrrolidone MW 1 million was added and the solution was allowed to tumble over night and then filtered. Spin coating at 4000, 5000 and 6000 rpm yielded films of 3.0, 2.0, and 1.6 μm thickness. All films were uniaxial and homeotropic and gave polarized birefringent dots when irradiated with laser light. Exchanging the ethanol to isopropanol resulted in thinner films at the same spinning rate (2.0, 1.4 and 1.2 μm). These films were also uniaxial and homeotropic and easily marked by laser irradiation.

EXAMPLE XII

Clean glass substrates were hydrophobized by gas phase exposure to hexamethyldisilane. Contact angle measurement with water showed contact angles larger than 90° A 16% solution containing 12% of an 80/20 mixture of azoamphiphiles A-1 and A-2 and 4% of polyvinylpyrrolidone, MW 1 million was spin coated onto the hydrophobized glass slides at 1500 rpm for 2 minutes. The resulting 0.5 μm thick films were uniaxial and homeotropic and gave birefringent marks when irradiated with a 0.1 W 354 laser line for 1/125 seconds.

EXAMPLE XIII

A 10% solution containing azoamphiphiles A-1/A-2 (80/20) and polyvinylpyrrolidone MW 1 million in the weight ratio 75/25 was knife coated onto 2×2Δ glass substrate using a 50 μm slot. The resulting film showed after drying an average thickness of 6.0 μm. The thickness variation across the sample was larger than obtained by spin coating. Conoscopy showed that thicker areas had tilted optical axis, that is, were not homeotropic. Most of the film surface was, however, homeotropic and uniaxial.

What is claimed:

1. An ordered multi-layer optical film medium exhibiting optical symmetry substantially perpendicular to its surface formed by preparing a solution of a means for defining a smectic liquid crystal amphiphile component and a means for defining a non-ionic water soluble polymer component followed by casting said solution into a film wherein the weight ratio of said polymer component to said amphiphile component is from about 2 parts by weight polymer component to 7 parts by weight amphiphile component to about 4 parts by weight polymer component to 3 parts by weight amphiphile component such that said film exhibits a substantially centrosymmetric conoscopic pattern upon rotation when observed along a direction perpendicular to the film surface and is substantially transparent.

2. The film according to claim 1, wherein said film is cast under mechanical stress.

3. The film according to claim 1, wherein said film is cast from a water solution.

4. The film according to claim 2, wherein said film is cast by spin-coating.

5. The film according to claim 1, wherein said water soluble polymer is selected from the group consisting of a hydroxyalkylcellulose polymer and polyvinylpyrrolidone and mixtures thereof.

6. The film according to claim 1, wherein said film includes a mixture of amphiphiles including at least a first and at least a second species.

7. The film according to claim 1, wherein said amphiphile exhibits lyotropic smectic liquid crystal properties.

8. The film according to claim 1, wherein said amphiphile exhibits thermotropic smectic liquid crystal properties.

9. The film according to claim 1, wherein said film is optically uniaxial.

10. The film according to claim 1, wherein said water soluble polymer has a molecular weight of at least about 300,000.

11. The film according to claim 1 wherein at least a portion of said film has been treated with light to induce birefringence which is observable along a direction perpendicular to the film surface.

12. The thin film optical medium according to claim 1 wherein said means for defining said smectic liquid crystal polymer component includes a compound of the formula:

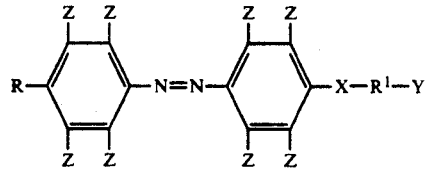

where R is an aliphatic substituent having a chain length of about 6-18 atoms; $R^1$ is a divalent aliphatic substituent having a chain length of about 2-12 atoms; X is a divalent electrondonating substituent; Y is a hydrophilic substituent; and each Z is independently hydrogen, alkyl, halogen, electron donating or an electron-withdrawing substituent 13. An optical medium in accordance with claim 12 which has a content of at least two different amphiphilic compounds corresponding to the formula of claim 13.

14. An optical medium in accordance with claim 12 wherein the water-soluble polymer content is between about 20-50 weight percent of the composite.

15. An optical medium in accordance with claim 12 wherein the water-soluble polymer is hydroxyalkyl cellulose or polyvinylpyrrolidone.

* * * * *